United States Patent Office 3,010,590
Patented Nov. 28, 1961

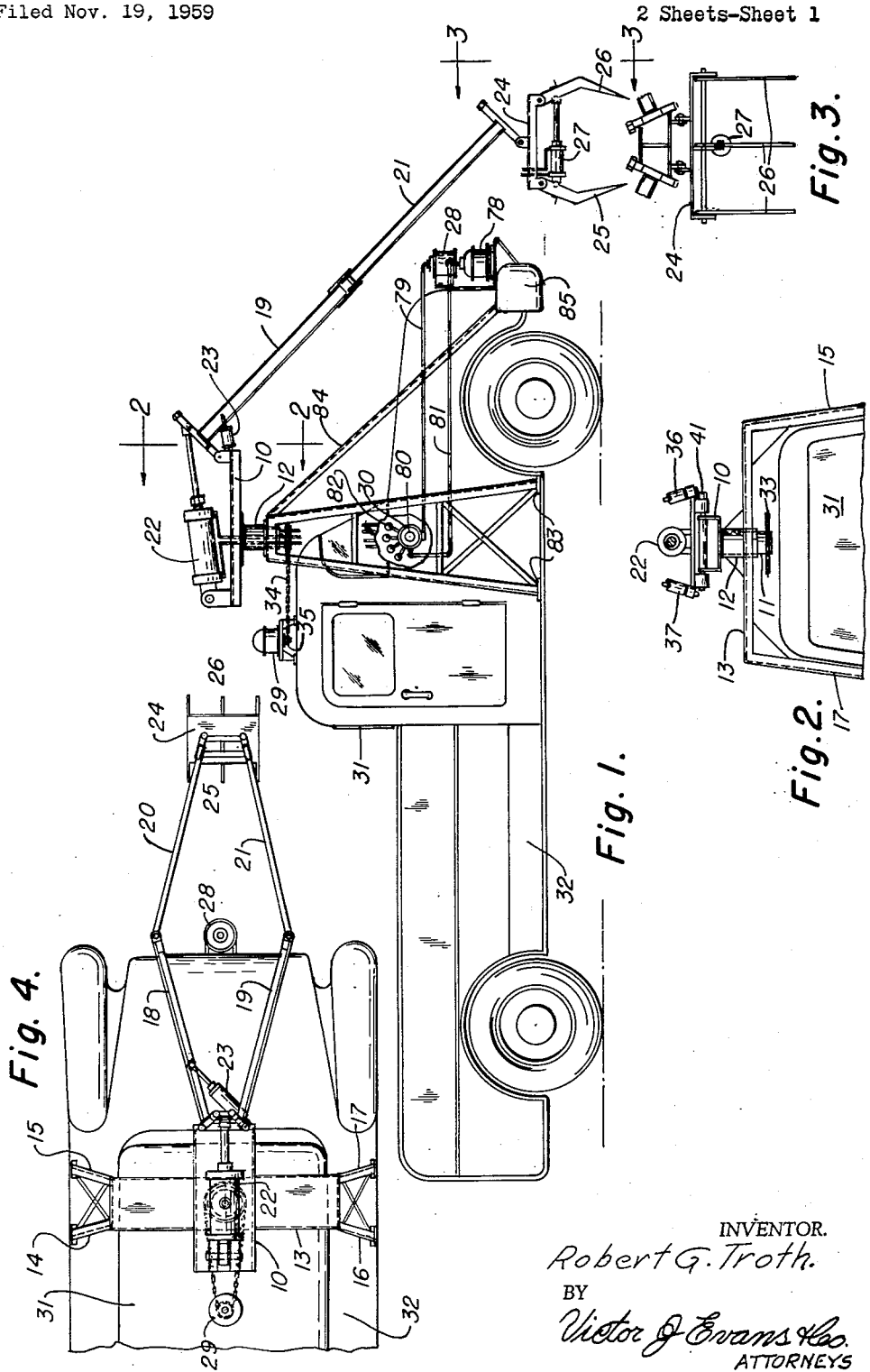

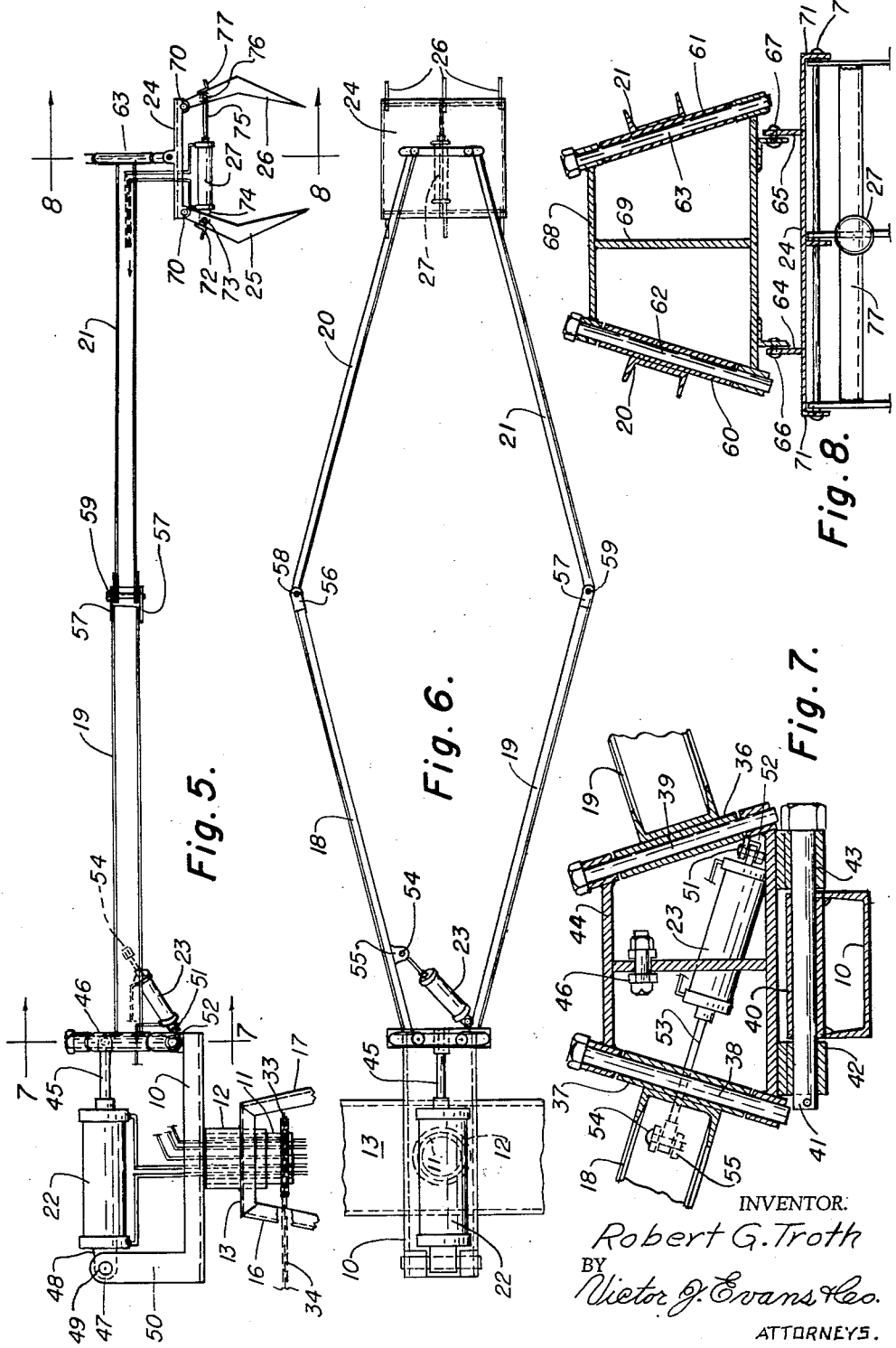

3,010,590
HYDRAULIC FORK
Robert G. Troth, Igloo, S. Dak.
Filed Nov. 19, 1959, Ser. No. 854,092
1 Claim. (Cl. 214—147)

This invention relates to power implements, and in particular a hydraulic fork used for picking up, loading and unloading bales of hay, loose hay, silage, ears of corn, bundles, rocks, earth, coal, and the like, and includes opposed sets of tines actuated by a hydraulic cylinder and carried by front and rear arms mounted on a turntable and actuated by hydraulic cylinders, a hydraulic motor, and a pump, whereby the fork is elevated and lowered and turned through an angle of 360° so that with the turntable mounted on a truck, or the like, products may be picked up at one end of the truck and deposited in a truck body or other vehicle, or on a stack, or in a storage bin or the like.

The purpose of this invention is to provide means for mounting a fork on a truck or the like so that the fork may be actuated through movements similar to the movements of a shovel or back hoe.

Various types of shovels, clamshells, bulldozers, back hoes and the like have been provided for use in agriculture, road building and building construction. However, such machines are comparatively heavy for farm use, and particularly for harvesting hay and the like. With this thought in mind this invention contemplates an attachment for a truck comprising a turntable, means for mounting the turntable on a truck, front and rear arms carried by the turntable, a fork mounted in extended ends of the arms, and hydraulic cylinders, a hydraulic motor, a pump, and a valve assembly arranged to be positioned in a cab of the truck for controlling the cylinders and motor.

The object of this invention is to provide a farm attachment for a truck whereby the operator of a truck may load the truck or other trucks while positioned on the operator's seat in the cab of the truck.

Another object of the invention is to provide a pick-up attachment for a truck in which the attachment may be installed on trucks now in use.

Another important object of the invention is to provide a mounting for a fork on a truck whereby the fork may be turned through 360°.

A further object of the invention is to provide a fork attachment for a truck in which the attachment is of a simple and economical construction.

With these and other objects and advantages in view the invention embodies a turntable, means for rotatably mounting the turntable on a truck, a motor for rotating the turntable, a pair of rear arms pivotally mounted on the turntable, a pair of front arms pivotally mounted in extended ends of the rear arms, opposed sets of tines carried by the front arms, and hydraulic means for actuating the turntable, arms, and tines.

Other features and advantages of the invention will appear from the following description taken in connection with the drawings, wherein:

FIGURE 1 is a side elevational view of a truck with the fork mounting and operating attachment installed thereon, and showing the fork in a lower, or picking-up position.

FIGURE 2 is front elevational view showing the upper part of the attachment, taken on line 2—2 of FIGURE 1, showing the turntable and fork arm attaching swivels.

FIGURE 3 is a front elevational view of the fork, taken on line 3—3 of FIGURE 1, with the fork supporting arms omitted.

FIGURE 4 is a plan view of the attachment showing the turntable, fork, and fork supporting arms, with the forward portion of a truck on which the fork is mounted shown in fine lines.

FIGURE 5 is a side elevational view of the arms for supporting the fork illustrating the mounting of the arms.

FIGURE 6 is a plan view of the arms, with the parts as shown in FIGURE 5.

FIGURE 7 is a cross-section through the mounting at the inner ends of the arms being taken on line 7—7 of FIGURE 5.

FIGURE 8 is a cross-section taken on line 8—8 of FIGURE 5 showing the mounting elements at the outer ends of the front arms.

Referring now to the drawings wherein like reference characters denote corresponding parts, the improved hydraulic fork of this invention includes a turntable 10 rotatably mounted by a pin 11 in a sleeve 12 on a plate 13 supported by struts 14 and 15 at one side and 16 and 17 at the opposite side, rear arms 18 and 19 pivotally mounted on the turntable, front arms 20 and 21 hinged to extended ends of the rear arms, a hydraulic cylinder 22 for elevating and lowering extended ends of the arms, a hydraulic cylinder 23 for extending and retracting the arms, a fork 24 carried by extended ends of the front arms and having sets of tines 25 and 26 actuated to open and closed positions by a combination hydraulic and spring operated cylinder 27, a pump 28 for supplying fluid under pressure, a motor 29 for rotating the turntable, and a multi-port valve 30 designed to be positioned in a cab 31 of a truck 32.

The lower end of the pin 11, which extends from the turntable 10 through the sleeve 12 is provided with a sprocket 33 over which a chain 34 is trained, and, as shown in FIGURE 1, the chain is also trained over a sprocket 35 on the lower end of the shaft of the reversible hydraulic motor 29. The motor is controlled by the valve 30 whereby the turntable may be rotated clockwise or counter-clockwise, and may turn through 360°.

The rear arms 18 and 19 are provided with hubs 36 and 37 that are positioned on pins 38 and 39 that extend upwardly in converging relation from a sleeve 40 which is pivotally mounted by a bolt 41 in ears 42 and 43 extended upwardly from the forward end of the turntable 10. The upper ends of the pins 38 and 39 are connected by a T-shaped plate member 44 on which the extended end of a piston rod 45 is mounted by a bearing 46. The piston rod extends from the cylinder 22 and the piston and cylinder provide means for raising and lowering the fork 24. The cylinder is pivotally mounted on the turntable by a pin 47 which extends through a tang 48 on the end of the cylinder and also through bearings 49 and 50 on the turntable.

The arms are extended and retracted by the cylinder 23, which is pivotally mounted by a pin 51 in a bearing 52 of the pin 39. A piston rod 53 of the cylinder 23 is connected by a pin 54 to a tang 55 on the inner surface of the rear arm 18, and with the parts arranged in this manner fluid under pressure applied to one end of the cylinder drives the hinge connections of the arms outwardly retracting the fork, and to the opposite end of the cylinder draws the hinge connections together driving the end of the boom formed by the arms outwardly.

It is preferred to form the rear and front arms of channel bars and the flanges of the arms 18 and 19 are provided with plates 56 and 57 which extend over flanges of the arms 20 and 21 whereby bolts 58 and 59 extended through the plates 56 and 57 and flanges of the front arms provide pivotal connections or hinges between the front and rear arms.

The extended ends of the front arms 20 and 21 are provided with hubs 60 and 61 which are positioned on converging pins 62 and 63, the lower ends of which are pivotally connected to tangs 64 and 65 on the back of the fork 24 by bolts 66 and 67. The pins 62 and 63 are positioned in inclined planes corresponding to the planes of the pins 38 and 39 whereby the axes of the pivotal elements are parallel. The upper ends of the pins 62 and 63 are connected by a bar 68, and the intermediate parts are supported by a brace 69.

The tines 25 and 26 of the fork are pivotally mounted by pins 70 in tangs 71 depending from the back 24 of the fork. The upper parts of the tines 25 are connected by an angle bar 72 and the center tine is pivotally connected to the hydraulic cylinder 27 by a pin 73 which extends through the tine and also through tangs 74 extended from the end of the cylinder. A piston rod 75 of the cylinder is connected by a pin 76 to the center tine of the tines 26, and the tines 26 are supported by an angle bar 77 similar to the angle bar 72. Fluid under pressure applied to one end of the cylinder 27 spreads the tines and pressure applied to the opposite end draws the tines together for gripping products, such as a bale of hay, or the like.

The pump 28 is operated by a motor 78 and the pressure or discharge side of the pump is connected by a tube 79 to the core 80 of the valve 30, and the outlet or discharge side of the valve is connected by a return tube or pipe 81 that extends to the suction side of the pump. By operating the valve 30 by a handle, or series of handles 82 pressure may be supplied to the cylinders and motor to actuate the fork for loading, unloading, stacking, and the like.

The lower ends of the struts 14, 15, 16, and 17, are provided with base plates 83 by which the struts are secured, such as by bolts or rivets, to the truck body or chassis, and upper ends of the struts may be supported by braces 84 from bumpers 85 of the truck.

With the parts designed and constructed as illustrated and described an operator in the cab of the truck may actuate the fork to pick up objects or products, and may swing the fork with a product therein to either side or through 360° depositing the product in the truck body or in another truck, or on a stack or in a bin or the like as may be desired. The attachment may readily be removed from the truck and also readily replaced thereon.

It will be understood that modifications, within the scope of the appened claim, may be made in the design and arrangement of the parts without departing from the spirit of the invention.

What is claimed is:

A hydraulic fork comprising a turntable, means for mounting the turntable on a truck above the superstructure on said truck so that said means will not interfere with the operation of said truck, said means comprising a pair of struts mounted on the running board of the truck in opposed relation to each other and a plate connected to and supported by the upper ends of said struts, said plate having a vertically disposed sleeve centrally thereof, and said turntable having a vertically disposed pin that is rotatably mounted in said sleeve, a hydraulic motor for rotating the turntable mounted on the superstructure of said truck, said motor having a shaft thereon depending below said motor and being in alignment with the pin on said turntable, the shaft of said motor and the pin on said turntable each having a sprocket fixed thereto and a chain operatively connecting the sprocket on the shaft on said motor to the sprocket on the pin on said turntable to operatively connect said turntable to said motor, a boom comprising rear arms and front arms, with the rear arms pivotally mounted on the turntable and extended therefrom and the front arms hinged to the free ends of the rear arms, a fork having opposed sets of tines pivotally mounted on the extended ends of the front arms, a hydraulic cylinder mounted on the turntable and connected to the rear arms adjacent the pivoted ends thereof for elevating and lowering the extended ends of the front arms and the fork connected thereto, a hydraulic cylinder mounted on one of said rear arms and connected to the turntable for extending and retracting the rear and front arms of the boom, a hydraulic cylinder mounted on said fork and pivotal means connecting the hydraulic cylinder on the fork to the tines of the fork for opening and closing the tines of the fork whereby the tines may pick up a product and the truck may be operated to carry the product to a remote point for the depositing thereof, the hydraulic motor for controlling the rotation of the turntable being of the reversable type, a pump provided for supplying fluid under pressure to the cylinders and motor, and valves for controlling fluid under pressure to said cylinders and motor are provided, which valves are mounted on the superstructure of the truck and the struts supporting the platform.

References Cited in the file of this patent
UNITED STATES PATENTS

| | | |
|---|---|---|
| 2,334,323 | Gilbert | Nov. 16, 1943 |
| 2,391,857 | Arps et al. | Jan. 1, 1946 |
| 2,674,385 | Stauth | Apr. 6, 1954 |
| 2,865,523 | Morrison | Dec. 23, 1958 |
| 2,933,210 | Dye | Apr. 19, 1960 |